US012163723B2

(12) United States Patent
Pagnozzi et al.

(10) Patent No.: US 12,163,723 B2
(45) Date of Patent: Dec. 10, 2024

(54) DOOR HINGE AND FOOT ASSEMBLY

(71) Applicant: ELECTROLUX DO BRASIL S.A., Curitiba (BR)

(72) Inventors: Rodrigo Marge Pagnozzi, Curitiba (BR); Aguilar Da Silva, Curitiba (BR); Alexandre Sauer, Curitiba (BR); Alcione Colecha, Curitiba (BR); Guilherme Rissatto Picanço, Curitiba (BR); Israel Mercer Neto, Curitiba (BR); Augusto Biscaia Da Silva, Curitiba (BR)

(73) Assignee: Electrolux do Brasil S.A., Curitiba (BR)

( * ) Notice: Subject to any disclaimer, the term of this patent is extended or adjusted under 35 U.S.C. 154(b) by 309 days.

(21) Appl. No.: 17/770,438

(22) PCT Filed: Oct. 25, 2019

(86) PCT No.: PCT/BR2019/050462
§ 371 (c)(1),
(2) Date: Apr. 20, 2022

(87) PCT Pub. No.: WO2021/077183
PCT Pub. Date: Apr. 29, 2021

(65) Prior Publication Data

US 2022/0373247 A1 Nov. 24, 2022

(51) Int. Cl.
*F25D 23/02* (2006.01)
*E05D 3/02* (2006.01)
(Continued)

(52) U.S. Cl.
CPC ............. *F25D 23/028* (2013.01); *E05D 3/02* (2013.01); *E05D 5/10* (2013.01); *E05D 11/0081* (2013.01);
(Continued)

(58) Field of Classification Search
CPC ................. F25D 23/028; F25D 29/005; F25D 2400/361; F25D 2400/38; F25D 2400/40;
(Continued)

(56) References Cited

U.S. PATENT DOCUMENTS 4,543,800 A 10/1985 Mawby et al.
4,609,234 A 9/1986 Naniwa et al.
(Continued)

FOREIGN PATENT DOCUMENTS

| | | |
|---|---|---|
| CN | 1075255326 | 12/2017 |
| EP | 0088670 | 9/1983 |
| EP | 2495516 | 9/2012 |

OTHER PUBLICATIONS

International Search Report for PCT/BR2019/050462 dated Jun. 24, 2020, 4 pages.

*Primary Examiner* — Marc E Norman
(74) *Attorney, Agent, or Firm* — Pearne & Gordon LLP

(57) ABSTRACT

A household appliance, such as a refrigerator, has a body with a cooled compartment, a door that restricts and grants access to said cooled compartment, a foot assembly connected to the body, and an electrical connector support for supporting electronic components of the household appliance. The foot assembly includes at least one of an anti-tip foot to support the appliance and/or a wheel to facilitate moving the appliance. The electrical connector support includes a frame base portion connected to the foot assembly, a door sensor support attached to the frame base portion, and a door sensor configured to sense if the door is at an open or a closed position relative to the body. At least one component of the door sensor is attached to the door sensor support.

20 Claims, 10 Drawing Sheets

(51) Int. Cl.
*E05D 5/10* (2006.01)
*E05D 11/00* (2006.01)
*F25D 29/00* (2006.01)

(52) U.S. Cl.
CPC ...... *F25D 29/005* (2013.01); *E05Y 2201/682* (2013.01); *E05Y 2800/28* (2013.01); *E05Y 2900/31* (2013.01); *F25D 2323/024* (2013.01); *F25D 2400/361* (2013.01); *F25D 2400/38* (2013.01); *F25D 2400/40* (2013.01); *F25D 2700/02* (2013.01)

(58) Field of Classification Search
CPC ......... F25D 2700/02; E05D 3/02; E05D 5/10; E05D 11/0081; E05Y 2201/682; E05Y 2800/28; E05Y 2900/31
See application file for complete search history.

(56) References Cited

U.S. PATENT DOCUMENTS

| | | | | |
|---|---|---|---|---|
| 5,263,509 | A | 11/1993 | Cherry et al. | |
| 5,522,656 | A | 6/1996 | Jenkins | |
| 5,941,619 | A | 8/1999 | Stieben et al. | |
| 7,490,384 | B2 | 2/2009 | Lee | |
| 8,690,273 | B2 | 4/2014 | Dolinsek et al. | |
| 8,721,013 | B2 | 5/2014 | Gore et al. | |
| 9,328,954 | B2 | 5/2016 | Kang et al. | |
| 9,719,717 | B2 | 8/2017 | Dolinsek et al. | |
| 9,739,523 | B1 | 8/2017 | Augsburger | |
| 9,970,610 | B1 | 5/2018 | Sandberg | |
| 10,591,348 | B1 * | 3/2020 | Shi | A47F 3/0408 |
| 10,666,868 | B2 | 5/2020 | Gubler et al. | |
| 2006/0017361 | A1 | 1/2006 | Rendel et al. | |
| 2006/0042306 | A1 | 3/2006 | Choi et al. | |
| 2009/0056367 | A1 | 3/2009 | Neumann | |
| 2013/0147336 | A1 | 6/2013 | Lee et al. | |
| 2013/0328471 | A1 | 12/2013 | Gore | |
| 2017/0153055 | A1 | 6/2017 | Hong | |
| 2018/0156380 | A1 * | 6/2018 | Lindel | F25D 23/00 |
| 2018/0202706 | A1 * | 7/2018 | Lee | F25D 29/005 |
| 2018/0224191 | A1 | 8/2018 | Hoffman | |
| 2019/0086141 | A1 * | 3/2019 | Kim | B21D 5/00 |
| 2019/0133321 | A1 * | 5/2019 | Vastmans | F16M 13/02 |
| 2019/0234683 | A1 | 8/2019 | Park et al. | |
| 2019/0323756 | A1 | 10/2019 | Alexander et al. | |

* cited by examiner

DOOR HINGE AND FOOT ASSEMBLY

TECHNICAL FIELD

This disclosure relates generally to a door hinge and foot assembly with integrated electronic components for use at the bottom of household appliances, for example refrigerators, freezers, and similar devices.

BACKGROUND

Increasingly, household appliances include a greater number of electronic components, particularly ones relating to user interaction, for example user interfaces, door sensors, cameras, lighting systems, alert systems, and display screens. In some cases, it is desirable for these electronic components to be housed within or attached to the door of the appliance. In these cases, wiring for these electronic components typically extends from the body of the household appliance to the door through a door hinge. It is desirable for the electronics components, including the wiring, to be adequately supported by the household appliance. Additionally, it is desirable for the components to be easily connectable and disconnectable during assembly, disassembly, and maintenance of the household appliance.

SUMMARY

The following presents a simplified summary of the disclosure in order to provide a basic understanding of some example aspects described in the detailed description.

In accordance with one aspect, there is provided a household appliance, such as a refrigerator, having a body with a cooled compartment, a door that restricts and grants access to said cooled compartment, a foot assembly connected to the body, and an electrical connector support for supporting electronic components of the household appliance. The foot assembly includes at least one of an anti-tip foot to support the appliance and/or a wheel to facilitate moving the appliance. The electrical connector support includes a frame base portion connected to the foot assembly, a door sensor support attached to the frame base portion, and a door sensor configured to sense if the door is at an open or a closed position relative to the body. At least one component of the door sensor is attached to the door sensor support.

The at least one component of the door sensor can be configured to interact with an additional component of the door sensor attached to the door. The at least one component of the door sensor can be an electronic reed switch. The door sensor support can include a receiving space for receiving and retaining the electronic reed switch at a fixed position immediately adjacent to the frame base portion.

The household appliance can further include electrical wires extending between the body and an interior of the door. The electrical connect support can further include a wire guide to retain and guide the electrical wires between the body and the interior of the door. The electrical wires extend between an electronic controller contained within or attached to the body and a user interface contained on the door, wherein the user interface enables a user to adjust a temperature of said cooled compartment.

The foot assembly can include a connecting leg connected to the household appliance. The foot assembly can include the wheel configured to contact and roll on a surface to adjust a position of the appliance relative to the surface. The wheel can be received rotatably retained within a wheel receiving space of the foot assembly.

The frame base portion of the electrical connect support can include connection arms downwardly extending from the frame base portion and configured to removably connect the frame base portion to the foot assembly. For example, the connection arms can extend downwardly from the frame base portion into the wheel receiving space of the foot assembly to connect the frame base portion to the foot assembly. The frame base portion can include a wheel cover sub-portion extending at a height to accommodate and cover the wheel.

The household appliance can further include a hinge plate connected to the body of the household appliance. A hinge shaft can be connected the hinge plate and pivotally connected to the door of the household appliance such that the door can pivot between an open position and a closed position with respect to the hinge shaft. The hinge shaft can be received within an opening of the hinge plate. The hinge shaft can include a hollow through passage such that electrical wires can extend from the body of the household appliance through the passage and into the door of the household appliance.

The household appliance can further include comprising a cover connected to the foot assembly, wherein the cover encloses the frame base portion, the door sensor support, and the at least one component of the door sensor.

In another embodiment, a household appliance comprises a body with a cooled compartment, a door that restricts and grants access to said cooled compartment, an electronic component on the door, and a door hinge and foot assembly to couple the door to the body. The door hinge and foot assembly comprise a hinge plate connected to the body of the household appliance and comprising a hinge shaft pivotally connected to said door of the household appliance such that the door can pivot between an open position and a closed position with respect to the cooled compartment. A foot assembly is connected to the body and comprising at least one of an anti-tip foot to support the appliance and/or a wheel to facilitate moving the household appliance. An electrical connector support is coupled to the foot assembly to support said electronic component on said door. The electrical connector support comprises a frame base portion connected to the foot assembly, and a wire guide to retain and guide electrical wires extending between an electronic controller contained within or attached to the body and a user interface contained on the door. The user interface enables a user to adjust a temperature of said cooled compartment.

The electrical connector support further comprises a door sensor support attached to the frame base portion, and a door sensor configured to sense if the door is at an open or a closed position relative to the body. At least one component of the door sensor is attached to the door sensor support.

BRIEF DESCRIPTION OF THE DRAWINGS

The above aspects, as well as other aspects of the disclosure, are better understood when the following detailed description is read with reference to the accompanying drawings, in which.

DETAILED DESCRIPTION OF EXAMPLE EMBODIMENTS

Figure 1:
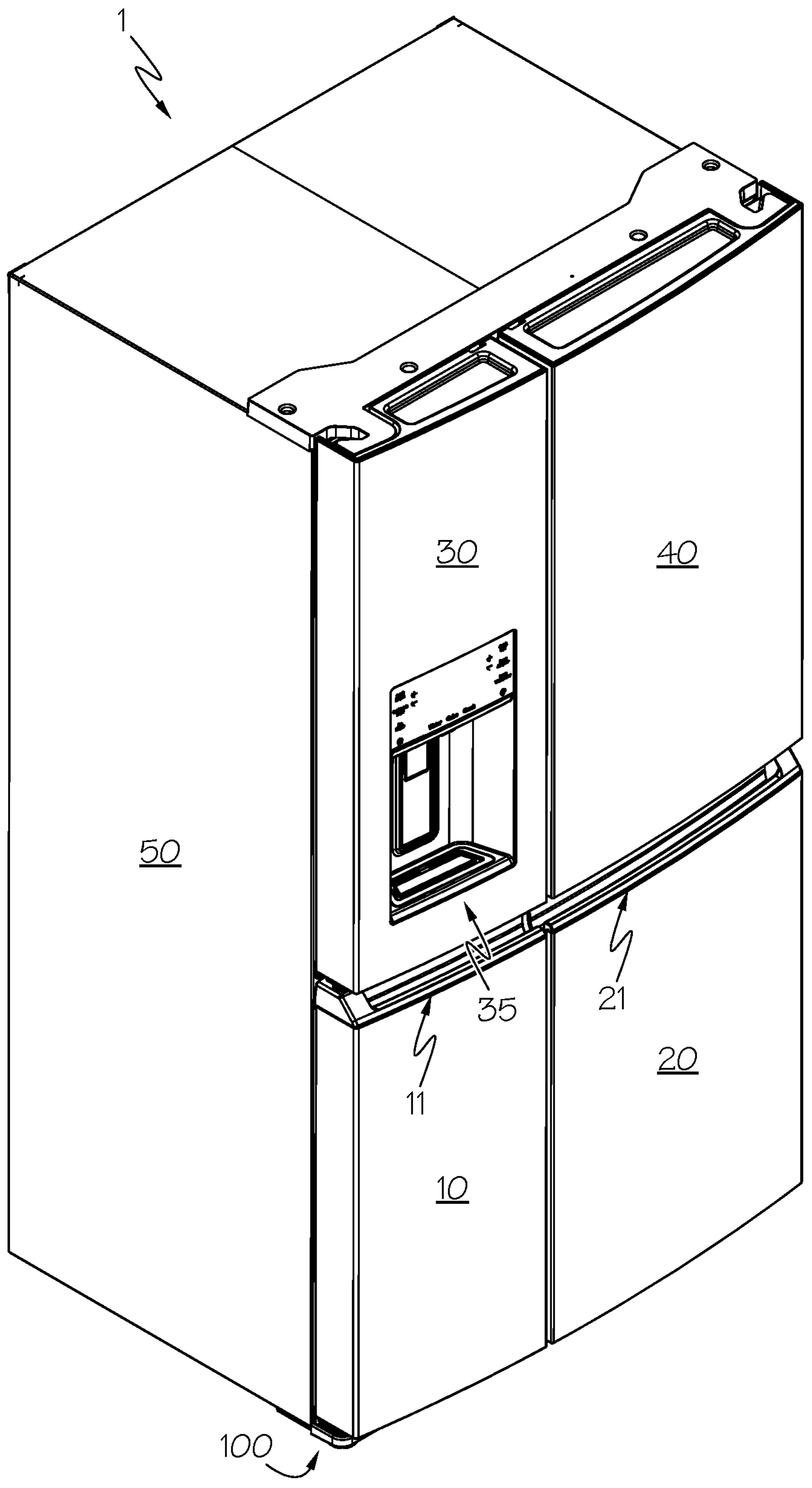
FIG. 1 is a perspective view of a four-door refrigerator.

Referring to FIG. 1, there is shown an example household appliance 1 in the form of a four-door refrigerator having a first door 10, a second door 20, a third door 30, and a fourth door 40 that restrict and grant access to various cooled compartments. Although the detailed description that follows concerns a domestic refrigerator, the invention can be embodied by refrigeration appliances other than a domestic refrigerator. The refrigerator body 50 houses a fresh-food compartment, a freezer compartment, and a variable temperature compartment. In one embodiment, when viewed from the front of the refrigerator 10 as shown in FIG. 1, the variable temperature compartment is contained in the lower left portion of the refrigerator body 50 and is accessible via the first door 10. The freezer compartment is contained in the lower right portion of the refrigerator body 50 and is accessible via the second door 20. In alternative embodiments, the variable temperature compartment can be contained in the lower right and accessible via the second door 20, and the freezer compartment can be contained in the lower left and accessible via the first door 10. The fresh-food compartment is contained in the upper portion of the refrigerator body 50 and is accessible via both of the third door 30 and fourth door 40 that are French-type doors which collectively span the entire lateral distance of the entrance to the fresh food compartment. As depicted, the third door 30 includes a water/ice dispenser 35. The doors 10, 20, 30, 40 are connected to hinges, allowing them to be rotated from a closed position (shown) to an open position (not shown) to selectively permit access to their respective compartments as is known in the art. It is to be understood that other configurations are contemplated, for example, a top-mount refrigerator (i.e., fresh food compartment disposed vertically below the freezer compartment), a side by side refrigerator (i.e., fresh food compartment disposed laterally adjacent the freezer compartment), etc.

The fresh food compartment serves to minimize spoiling of articles of food stored therein. The fresh food compartment accomplishes this by maintaining the temperature in the fresh food compartment at a cool temperature that is typically above 0° C., so as not to freeze the articles of food in the fresh food compartment. It is contemplated that the cool temperature preferably is between 0° C. and 10° C., more preferably between 0° C. and 5° C. and even more preferably between 0.25° C. and 4.5° C.

The freezer compartment is used to freeze and/or maintain articles of food stored therein in a frozen condition. For this purpose, the freezer compartment is in thermal communication with a freezer evaporator (not shown) that removes thermal energy from the freezer compartment to maintain the temperature therein at a temperature of 0° C. or less during operation of the refrigerator, preferably between 0° C. and −50° C., more preferably between 0° C. and −30° C. and even more preferably between 0° C. and −20° C.

The VCZ compartment provides a user-adjustable storage area whose temperature can be maintained at either the temperature associated with the fresh food compartment or that of the freezer compartment (or anywhere therebetween). That is, the temperature maintained in the VCZ compartment is adjustable so as to accommodate a wide variety of food articles to be stored therein.

Figure 2:
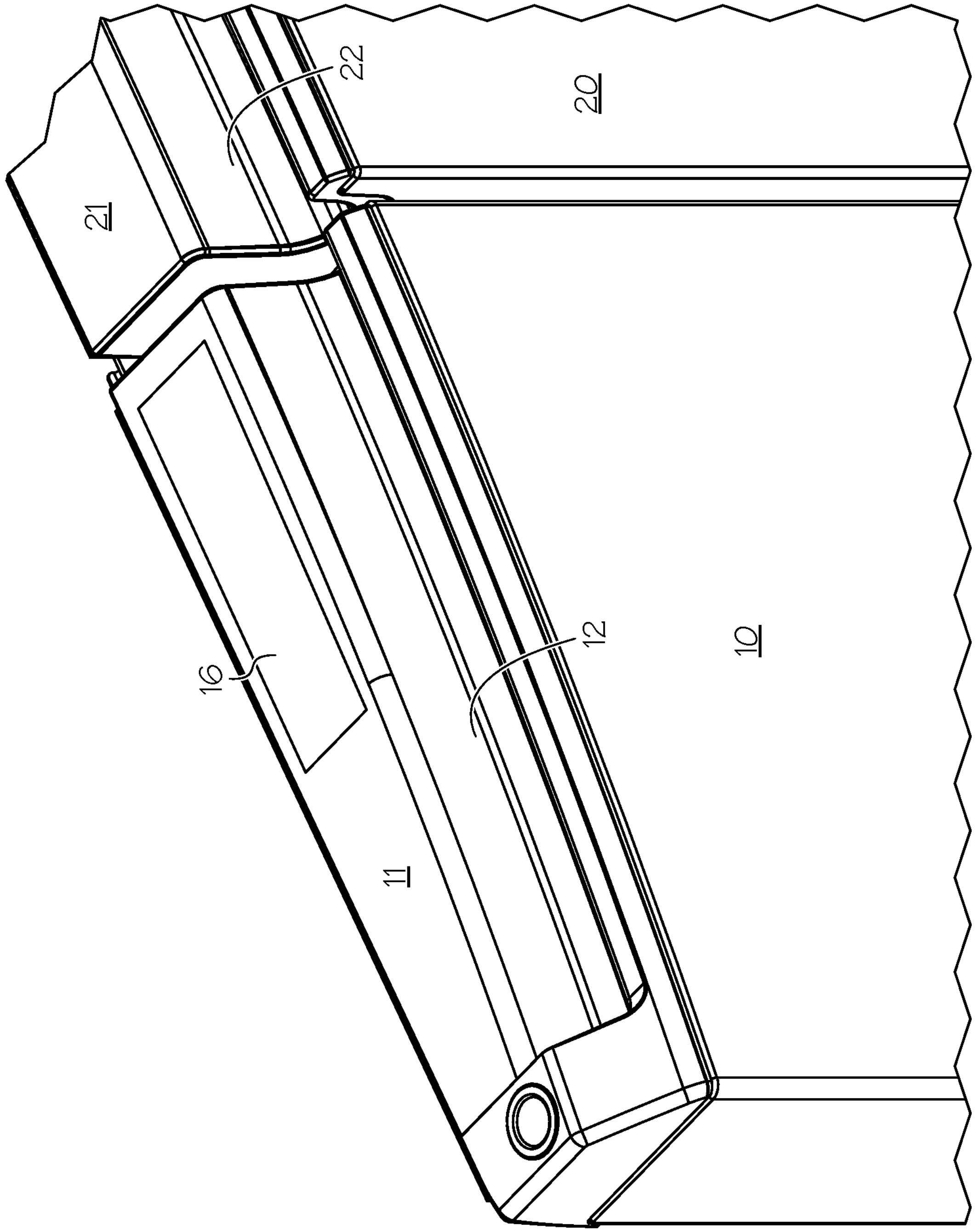
FIG. 2 is a perspective detail view of the top of the bottom left refrigerator door of the refrigerator of FIG. 1.

Referring now to FIGS. 1 and 2, the upper face 11 of the first door 10 includes a handle 12 that allows the door 10 to be opened. Similarly, the upper face 21 of the second door 20 includes a handle 22 that allows the door 20 to be opened. The first door 10 further includes at least one electronic component that utilizes electricity to operate, such as any or all of a user interface, a door sensor, a camera, a lighting system, an alert system, and/or a display screen. In one embodiment, the at least one electronic component is a user interface 16 that allows a user to control the temperature settings of the variable control compartment. As shown, the user interface 16 can be located upon the upper face 11, or alternatively can be located at another portion of the first door 10, such as a side panel or front face of the door. As discussed in greater detail below, in order to control the temperature settings of the variable control compartment, the user interface 16 is connected to a controller 55 of the refrigerator 1 via electrically-conductive wires 163, 164. Preferably, the wires 163, 164 provide both electrical power to the user interface, and further provide electronic communication via digital and/or analog signals to a control system of the refrigerator. The wires 163 extend from the door 10 and into the refrigerator body 50 through a door hinge and foot assembly 100 system connected to the lower end of the refrigerator body 50.

Figure 3:
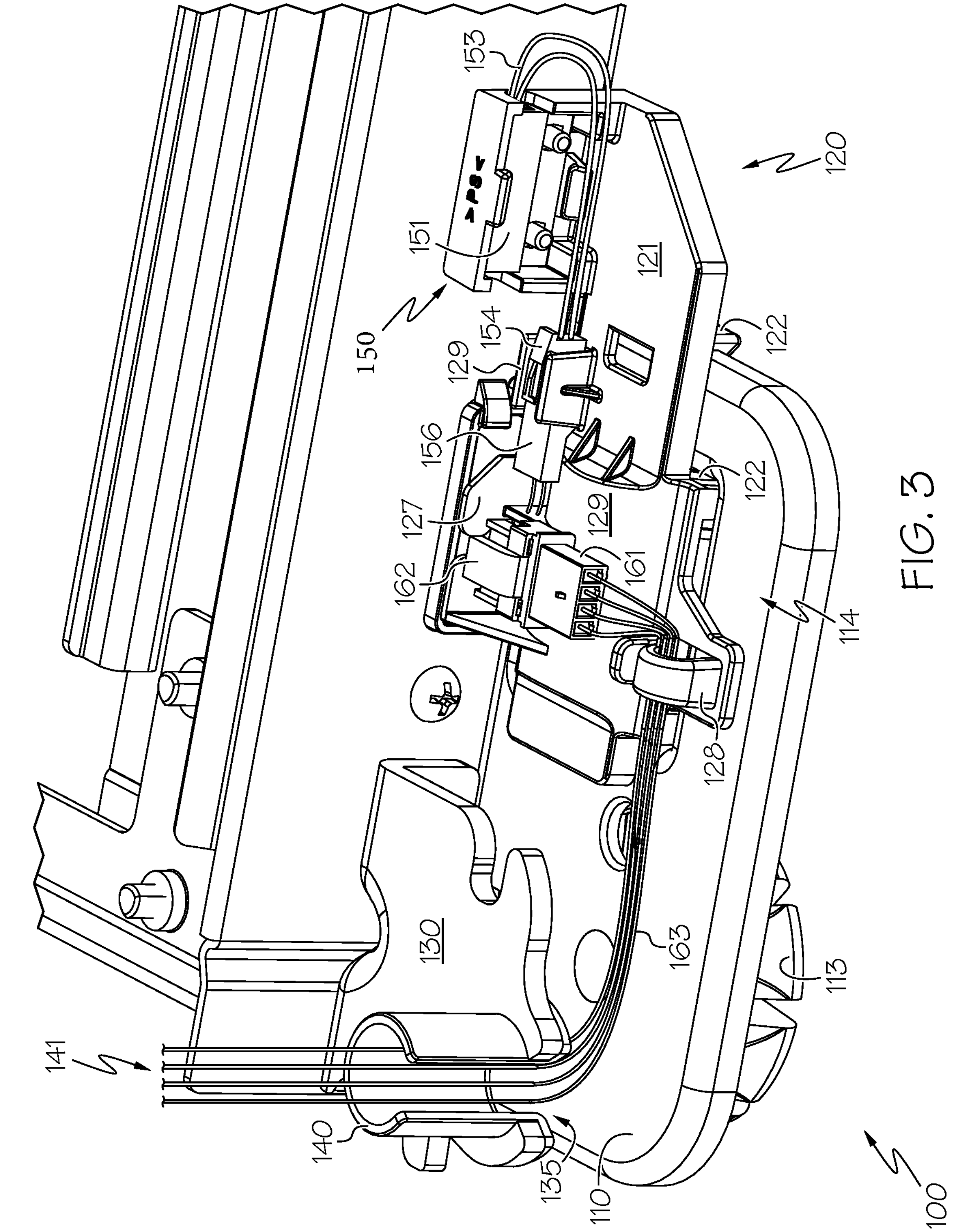
FIG. 3 is a first perspective view of a door hinge and foot assembly of the refrigerator of FIG. 1.
Figure 4:
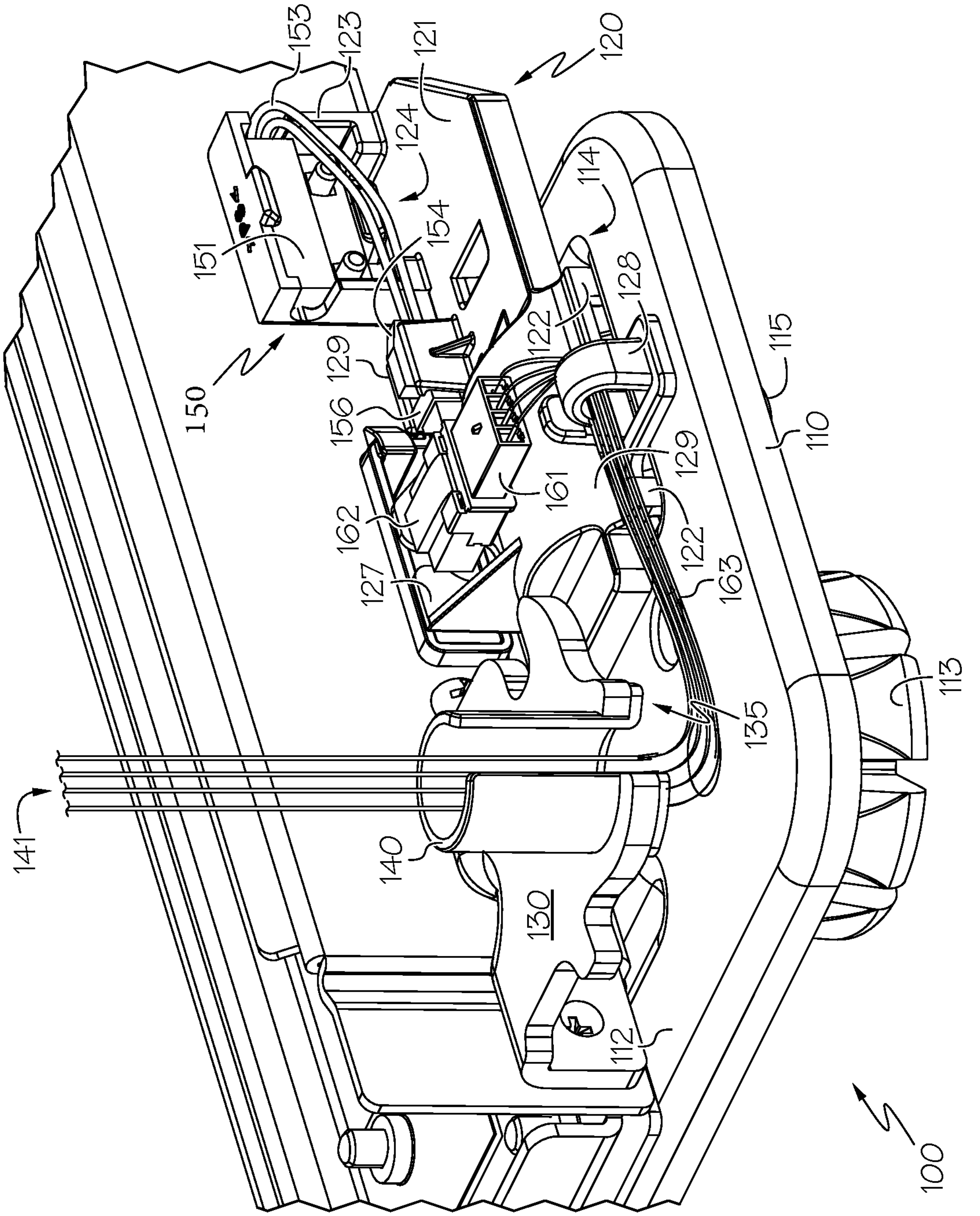
FIG. 4 is a second perspective view of a door hinge and foot assembly of the refrigerator of FIG. 1.

Referring now to FIGS. 3-4, the door hinge and foot assembly 100 includes a foot base 110, an electrical connector support 120, a door hinge plate 130, a hinge shaft 140, and at least a component of a door sensor 150, all of which are discussed in greater detail below. FIGS. 3-4 illustrate the components of the door hinge and foot assembly 100 secured to a bottom front exterior of the refrigerator 1 at a position to pivotally support the first door 10 upon the refrigerator body 50. The foot base 110 is fixed to the cabinet and is separate or independent from the door hinge plate 130. The hinge shaft 140 is secured to the door hinge plate 130 in a removable manner (e.g., via fasteners) or preferably in a non-removable manner (e.g., via welding), and further fixed to the cabinet as a single unit.

Figure 5:
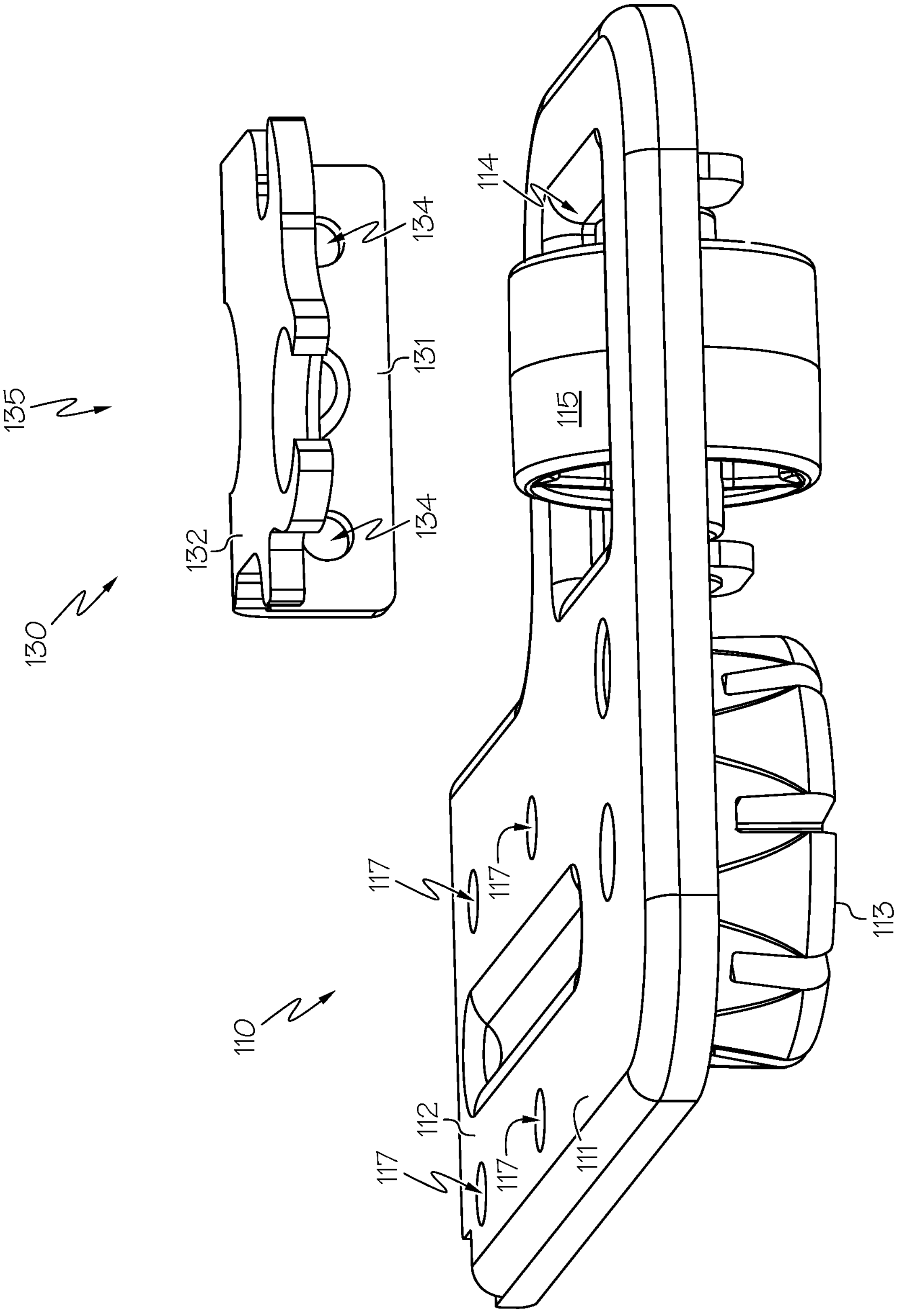
FIG. 5 is a perspective view of a foot base and hinge plate of the door hinge and foot assembly of FIGS. 3 and 4.

Referring now to FIG. 5, the foot base 110 includes an anti-tip foot 113 and a wheel 115. In the shown example, the foot base 110 is generally configured in the shape of an L, including a support leg 111 and a connecting leg 112, although other geometries are contemplated. Mounted to the lower left side of the supporting leg 111 is the anti-tip foot 113 that serves to support the refrigerator 1 by resting on a surface. The anti-tip foot 113 prevents the refrigerator 1 from leaning forward, and is height adjustable such that the height of the front left side of the refrigerator 1 can be adjusted relative to the ground support surface that the refrigerator 1 is resting upon. The anti-tip foot 113 can be utilized in conjunction with other height-adjustable feet (not shown) of the refrigerator 1 in order to level the refrigerator 1. The support leg 111 also includes a wheel receiving space 114 on the right side thereof, which is configured generally as a rectangular opening having rounded edges extending through the support leg 111. As depicted, the wheel receiving space 114 receives the wheel 115 which can roll along the surface that the anti-tip foot 113 rests on. Thus, this wheel 115 allows the refrigerator 1 to be easily moved with respect to the surface. The connecting leg 112 has fastener holes 117 such that fasteners can connect the foot base 110 to the body 50 of the refrigerator 1, as discussed in more detail below.

Continuing with FIG. 5, the door hinge plate 130 includes a first, vertically-oriented leg 131 and a second, horizontally-oriented leg 132 connected to one another at a generally right angle. Preferably the door hinge plate 130 is a monolithic body including both of the vertically and horizontally oriented legs 131, 132, however, the legs 131, 132 could also be separate components that are attached together. The first leg 131 includes fastener holes 134 shaped to receive fasteners that can secure the hinge plate 130 to the body 50 of the refrigerator 1 at a position to pivotally support the first door 10. The front edge of the second leg 132 includes an opening 135 configured to receive the hinge shaft 140, as discussed in greater detail below. The hinge shaft 140 is pivotally received within complementary structure on the bottom of the door 10 to enable the door to pivotally rotate relative to the refrigerator body 50. It is also contemplated that the hinge shaft 140 could be integrally formed together with the hinge plate 130, or may be removably secured, such as by fasteners, or non-removably secured, such as by welding.

Figure 6:
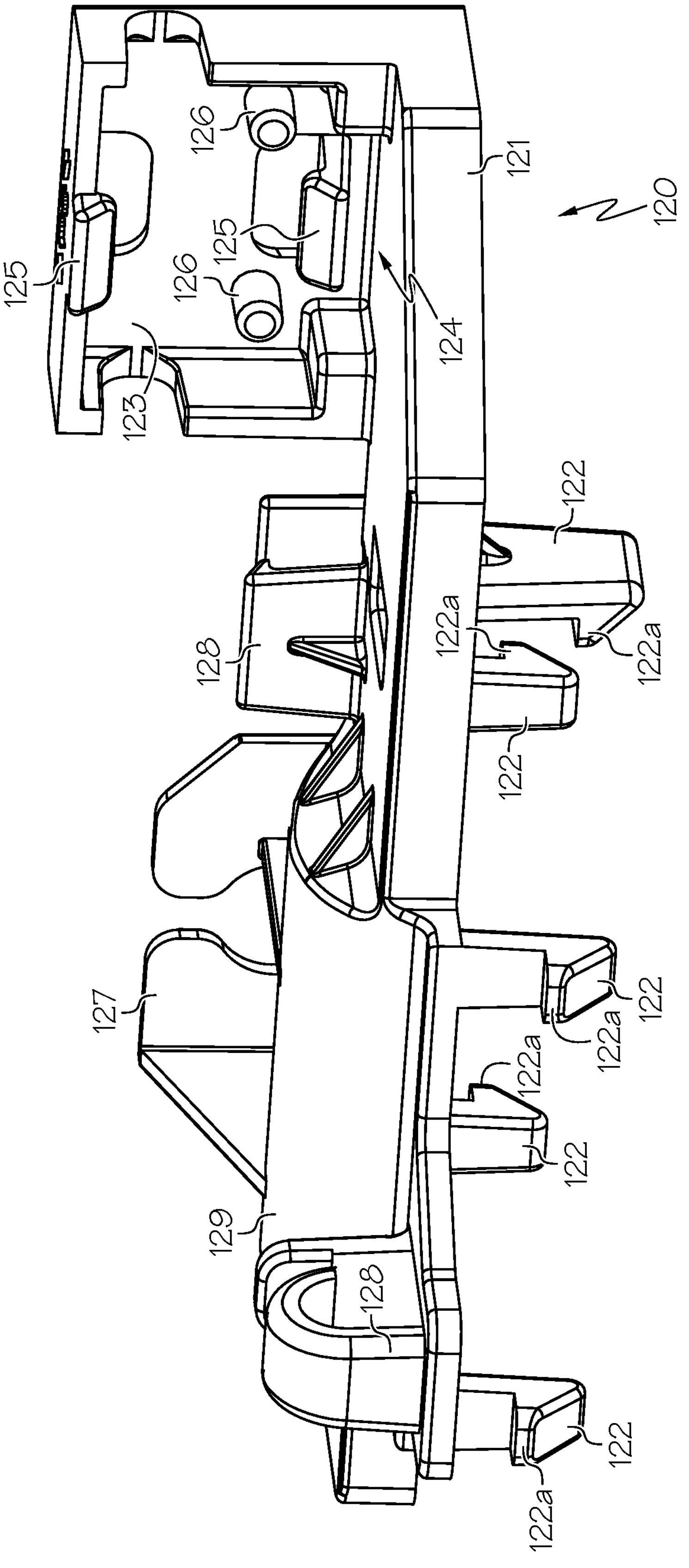
FIG. 6 is a front perspective view of an electrical connector support of the door hinge and foot assembly of FIGS. 3 and 4.
Figure 7:
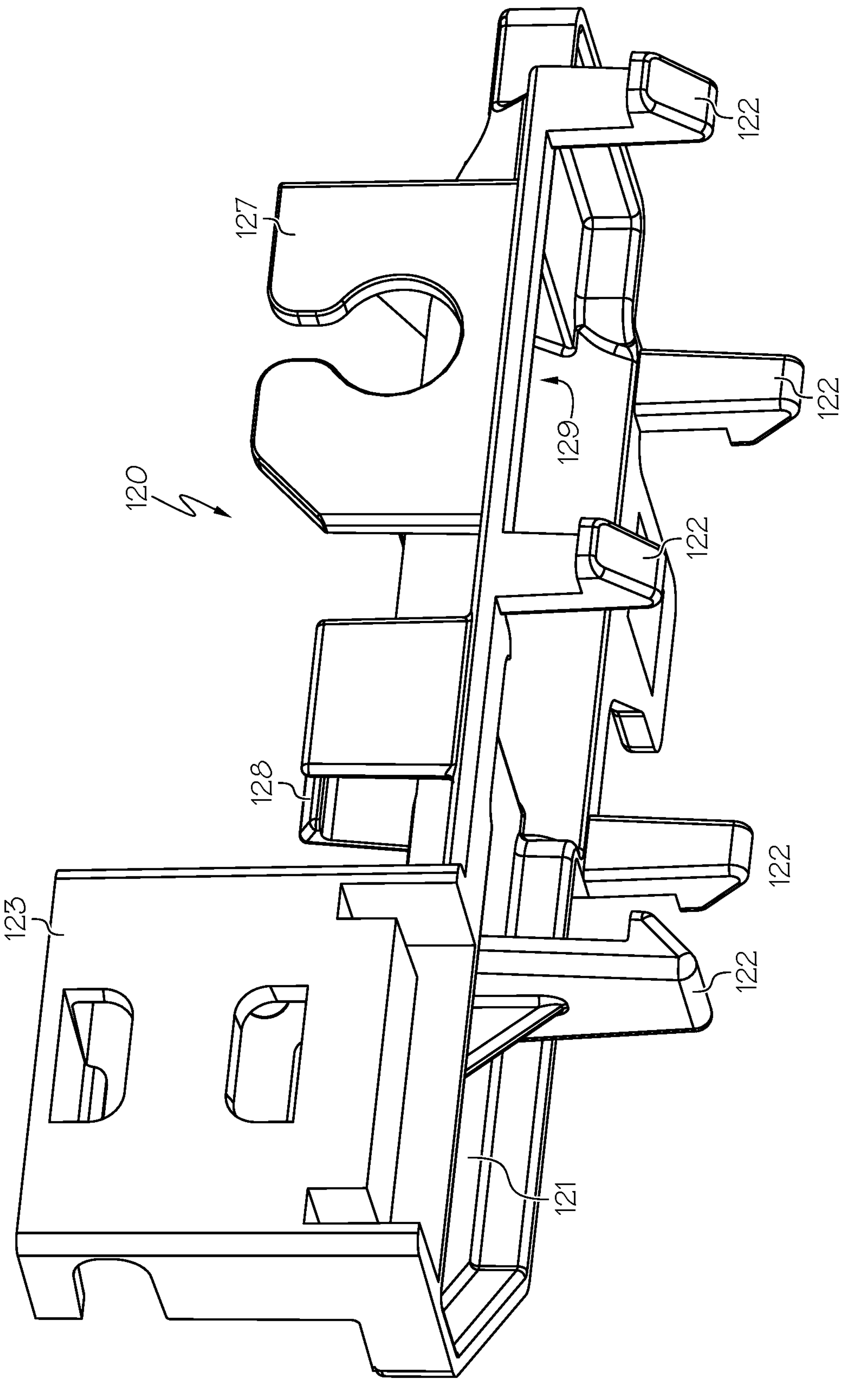
FIG. 7 is a rear perspective view of an electrical connector support of the door hinge and foot assembly of FIGS. 3 and 4.

Referring now to FIGS. 6-7, the electrical connector support 120 includes a frame base portion 121 making up the body of the support 120. Extending downwards from the frame base portion 121 are a number of connecting arms 122, designed to be received by and connect to the foot base 110 in order to removably secure the electrical connector support 120 thereto. The connection arms 122 preferably have locking protrusions 122*a* and are configured to be resiliently flexible. In this regard, the connection arms 122 can flex such that the locking protrusions 122*a* can slide past the foot base 110 and then flex back to their original position such that the locking protrusions 122*a* are locked underneath the foot base 110. At least one connection arm is configured to be received and secured within the wheel receiving space 114. In the shown example, four of the five connection arms 122 are configured to be received and secured within the wheel receiving space 114, whereas the fifth arm 122 is secured to the right edge of the support leg 111. Various other mounting locations for the connection arms 122 are contemplated upon the foot base 110. A wheel cover portion 129 is a sub-portion of the frame base portion 121, and is shaped to accommodate in a covering relationship the portion of the wheel 115 that extends upwards and beyond the wheel receiving space 114 underneath the electrical connector support 120.

Extending from the rear right in an upwards direction (when viewing FIG. 6) of the frame base portion 121 is a door sensor support 123. The door sensor support 123 is configured to support at least a first portion of a door sensor 150. In one example, the door sensor is an electronic reed switch 151 configured to operate by an applied magnetic field (see FIGS. 3-4), although other types of sensors are contemplated (push button switches, plunger switches, capacitive sensors, optical sensors, etc.). Where an electronic reed switch 151 is used, the rear of the door sensor support 123 is preferably configured to rest directly against the body 50 of the refrigerator and in a position to be immediately adjacent to a magnet secured to a bottom of the door 10 when the door 10 is in a closed position. Thus, when the door 10 is in the closed position, the magnet secured to the underside of the door 10 will cause the electronic reed switch 151 to activate or deactivate, according to its specific design, to thereby provide an electronic indication that the door 10 is closed. The door sensor support 123 includes a receiving space 124 to receive the door sensor 150. The door sensor support 123 further includes structure to secure the door sensor 150 thereto at a fixed position, such as a pair of connection arms 125 and a pair of mounting rods 126. The door sensor 150 is shaped to fit within the receiving space 124 and be secured by the connection arms 125 when the mounting rods 126 are inserted through holes of the door sensor 150. With the door sensor 150 in place, it can be utilized to detect whether the door 10 is open or closed relative to the refrigerator body 50, as discussed in greater detail below. It is contemplated that the door sensor support 123 can be suitably designed to accommodate the specific needs of the type of door sensor 150 that is utilized.

Returning now to FIGS. 3-4, as discussed above, the user interface 16 of the door 10 is connected to a digital and/or analog electronic controller 55 of the refrigerator 1 via electrically conductive wires 163, 164. The wires 163 extend through the door 10, are optionally permanently installed in the insulating foam of the door, and exit a bottom of the door through an interior hollow passage 141 extending through the hinge shaft 140. Because it is common for refrigerator doors to be removable, hinge shaft 140 can include an open slot extending through one side thereof that extends the entire vertical height of the hinge shaft 140 to enable the wires 163 to pass therethrough and into the passage 141 if the door 10 is removed from or installed onto the hinge shaft 140. Preferably the open slot of the hinge shaft 140 is aligned with the front-facing opening 135 in the hinge plate 130. Additionally, the wires 163 of the door 10 are preferably connected to a connector terminal 161, which itself is detachably connected to a connector terminal 162 that extends out from a front edge of the refrigerator body 50. The connector terminal 162 is connected to the controller 55 via wires 164 located within the refrigerator body 50. Preferably, the connector terminal 162 is supported outside the refrigerator body 50 by a connector guide 127 on the electrical connector support 120. Optionally, the electrical connector support 120 further includes at least one wire guide 128 to removably receive and guide the wires 163 between the hinge shaft 140 and the connector terminal 161. The wire guide 128 helps to hold the wires 163 in place to reduce the movement thereof while during assembly and/or use of the refrigerator 1 and to allow, for example, a cover 170 (see FIGS. 8-9) to be easily secured over the rest of the door hinge and foot assembly 100 without requiring the wires 163 to be moved out of the way. In a similar fashion, the connector guide 127 helps to hold the connector terminals 161, 162 and wires 164 in place to reduce the movement thereof. Although the illustrated connector guide 127 indirectly holds the connector terminal 161 when it is coupled to the connector terminal 162, it is contemplated that the connector guide 127 or another separate guide can be provided to directly hold the connector terminal 161.

The foot base 110 is attached to the refrigerator body 50 via fasteners (such as screws or bolts, not shown) inserted into the fastener holes 117. As shown in FIGS. 3-4, the foot base 110 can be secured to a bottom surface of the refrigerator body 50, although it could instead be coupled to a bottom front surface of the refrigerator body 50. The electrical connector support 120 is attached to the foot base 110 via the connection arms 122 being received by and connected to the foot base 110. The hinge plate 130 (such as screws or bolts, not shown) is secured to the refrigerator body via fasteners inserted into the fasteners holes 134 of the hinge plate 130. The hinge shaft 140 is removably or non-removably received within the opening 135 in the hinge plate 130. The door sensor 150 is received within the receiving space 124 of the door sensor support 123, and the wires 153 extend from the reed switch 151 to a connector terminal 154 that is detachably connected to a mating terminal 156 that extends out from a front edge of the refrigerator body 50. The connector terminal 156 is connected to the controller 55 via wires 155 located within the refrigerator body 50. Either or both of the connector terminals 154, 156 can be retained in place by a connector guide 129 on the electrical connector support 120.

Figure 8:
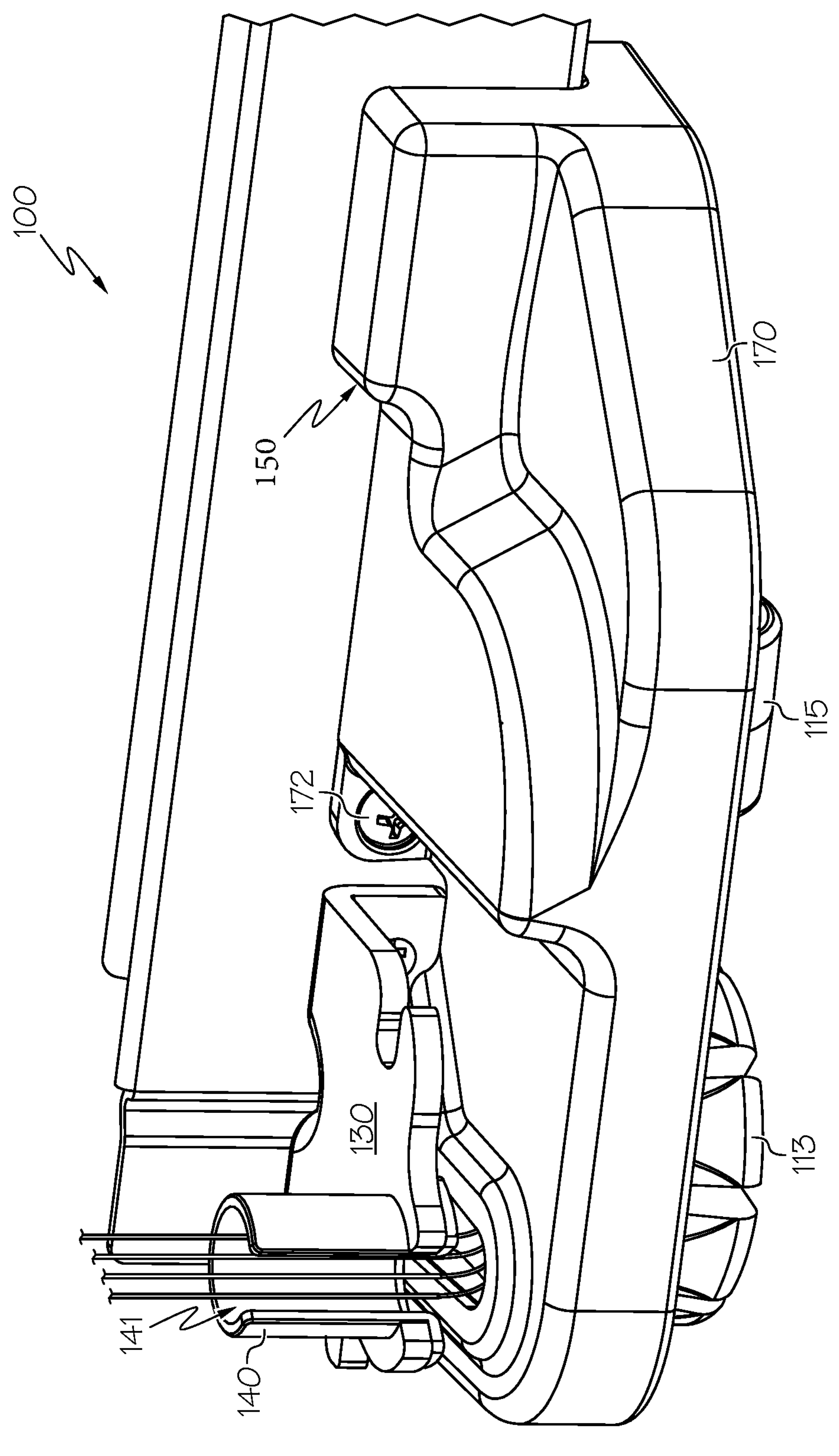
FIG. 8 is a perspective view of a door hinge and foot assembly of the refrigerator of FIG. 1 having a cover.
Figure 9:
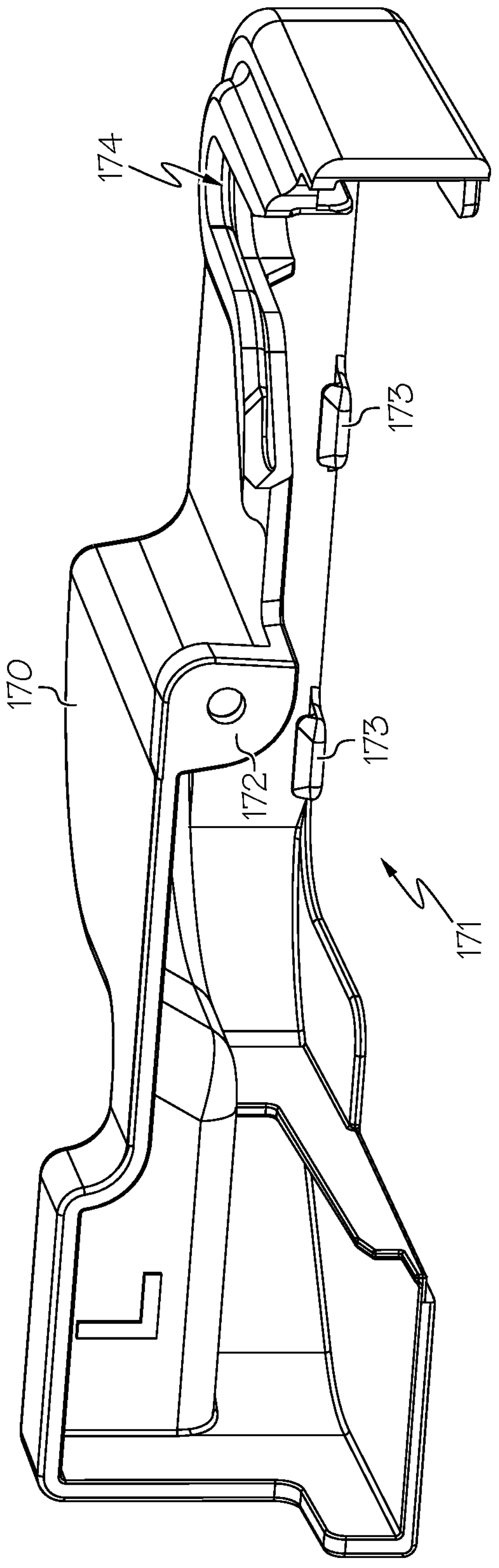
FIG. 9 is a rear perspective view of the cover shown in FIG. 8.

Referring now to FIGS. 8 and 9, with all the components of the door hinge and foot assembly 100 in place and secured to the refrigerator body 50, a cover 170 can be placed over the door hinge and foot assembly 100 to protect and cover some or all of the components thereof. Preferably, the cover 170 has a form-fitting shape that closely matches that of components that it covers. The cover 170 includes a hollow internal receiving space 171 that receives many of the components of the door hinge and foot assembly 100. The cover 170 is inserted over the front edge of the foot base 110 and covers the first leg 111 thereof as well as the electrical connector support 120 and the components attached thereto. The cover 170 includes a mounting tab 172 for receiving a fastener to secure the cover 170 to the body 50 as well as flex arms 173 to secure the cover to the door hinge and foot assembly 100. The cover 170 also includes a slot 174 generally aligned with the hinge shaft 140 to accommodate the wires 163 extending from the hinge shaft 140 to the electrical connector support 120. The cover 170 preferably also covers the door sensor 150, such as the reed switch 151, and is made of a material that is dielectric and transparent to magnetic fields.

Figure 10:
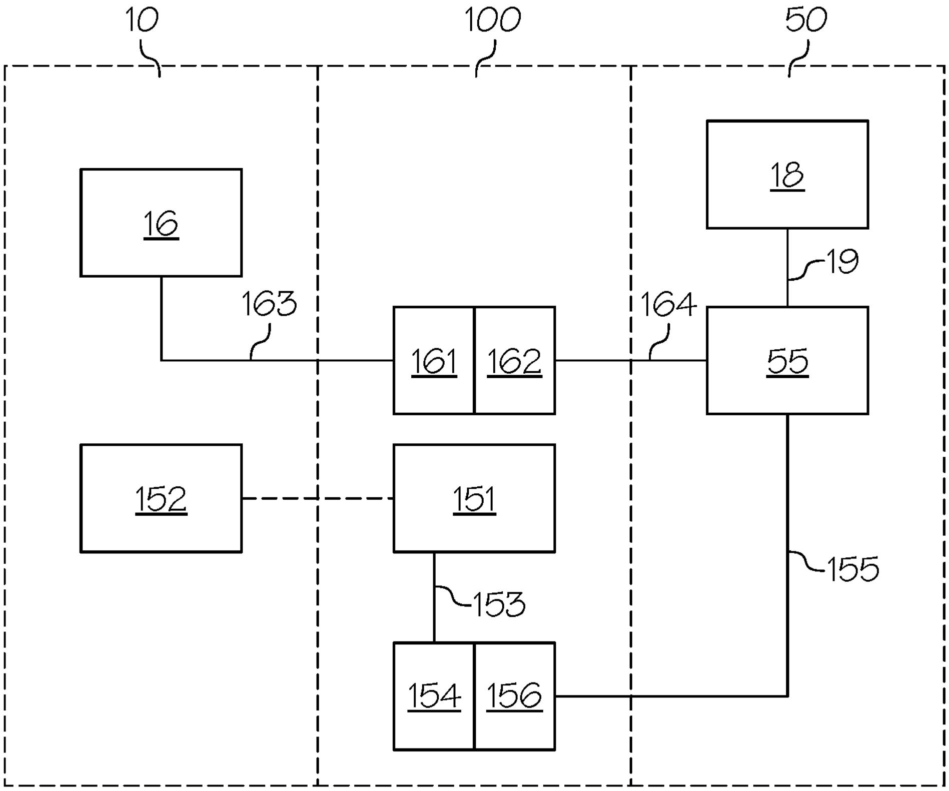
FIG. 10 is a schematic diagram showing one embodiment of electronic components of the refrigerator 1.

Finally, referring now to FIG. 10, this figure schematically represents one example embodiment of connections between the electrical components of the refrigerator 1. The electronic component of the door 10, such as a user interface 16, and a second portion of the door sensor 150, e.g. a magnet 152, are contained in or otherwise attached to the door 10. It is appreciated that the magnet 152 can be a simple magnet, i.e., non-electronic. Alternatively, where a different type of door sensor system is used, the second portion of the door sensor 150 can any other suitable type of door sensor component. The connector terminals 161, 162 as well as the first portion of the door sensor, e.g. the reed switch 151 and associated connector terminals 154, 156, are connected to/supported by the door hinge and foot assembly 100. The refrigerator main controller 55 and a cooling system 18 that provides cooling for at least the variable temperature compartment to regulate the temperature therein based on the input from the user via the user interface 16 are contained within (or otherwise attached to) the refrigerator body 50. The wires 163 extend from the user interface 16, through the door 10, and to the connector terminal 161 supported by the door hinge and foot assembly 100. The connector terminal 161 is connected with the connector terminal 162 also supported by the door hinge and foot assembly 100. The wires 164 extend into the refrigerator body 50 where they are electrically connected to the controller 55. Wires 19 connect the controller 55 to the cooling system 18. The reed switch 151 is attached to wires 153 which extend into the refrigerator body 50 where they connect to the refrigerator main controller 55. The reed switch 151 is configured as is known in the art such that when the door 10 is closed, the magnet 152 contained therein is detected by the reed switch 151 such that a signal is sent to the controller 55 through wires 153 indicating that the door 10 is closed. If such a signal is not sent, the controller 55 is configured to assume that the door 10 is open, and can be configured to provide a signal or message to a user indicating that the door 10 is open. Although the terms "signal" and "sent" are used above, it is understood that the door sensor 150 (i.e., reed switch 151) can be an analog component that provides a sensor input to the controller 55, such as an open or closed connection (i.e., a switch), a resistance, a capacitance, etc., which the controller 55 can interpret to thereby determine whether the door 10 is open or closed.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims and their equivalents.

The invention claimed is:

1. A household appliance comprising a body with a cooled compartment, a door that restricts and grants access to said cooled compartment, a foot assembly connected to the body and comprising at least one of an anti-tip foot to support the appliance and/or a wheel to facilitate moving the household appliance, and the foot assembly comprising an electrical connector support, comprising:

a frame base portion connected to the foot assembly;

a door sensor support attached to the frame base portion; and a door sensor configured to sense if the door is at an open or a closed position relative to the body, wherein at least one component of the door sensor is attached to the door sensor support.

2. The household appliance of claim 1, the door sensor including an electronic reed switch.

3. A household appliance comprising a body with a cooled compartment, a door that restricts and grants access to said cooled compartment, a foot assembly connected to the body and comprising at least one of an anti-tip foot to support the appliance and/or a wheel to facilitate moving the household appliance, and an electrical connector support coupled to the foot assembly to support electronic components of the household appliance, the electrical connector support comprising: a frame base portion connected to the foot assembly;

a door sensor support attached to the frame base portion; and a door sensor configured to sense if the door is at an open or a closed position relative to the body, wherein at least one component of the door sensor is attached to the door sensor support, the door sensor support including the sensor which is received and retained in a receiving space at a fixed position adjacent to the frame base portion.

4. The household appliance of claim 1, further comprising electrical wires extending between the body and an interior of the door.

5. The household appliance of claim 4, the electrical connector support further comprising a wire guide to retain and guide the electrical wires between the body and the interior of the door.

6. The household appliance of claim 4, the electrical wires extending between an electronic controller contained within or attached to the body and a user interface contained on the door, wherein the user interface enables a user to adjust a temperature of said cooled compartment.

7. The household appliance of claim 1, the frame base portion further comprising:

connection arms downwardly extending from the frame base portion and configured to removably connect the frame base portion to the foot assembly.

8. The household appliance of claim 1, the foot assembly comprising a connecting leg connected to the household appliance.

9. The household appliance of claim 1, wherein the foot assembly comprises the wheel configured to contact and roll on a surface to adjust a position of the appliance relative to the surface, the wheel being rotatably retained within a wheel receiving space of the foot assembly.

10. The household appliance of claim 9, the electrical connector support further comprising: connection arms extending downwardly from the frame base portion into the wheel receiving space of the foot assembly to connect the frame base portion to the foot assembly.

11. The household appliance of claim 9, the frame base portion comprising a wheel cover sub-portion extending at a height to accommodate and cover the wheel.

12. The household appliance of claim 1, further comprising a hinge plate connected to the body of the household appliance.

13. The household appliance of claim 12, further comprising a hinge shaft connected the hinge plate and pivotally connected to the door of the household appliance such that the door can pivot between an open position and a closed position with respect to the hinge shaft.

14. The household appliance of claim 13, wherein the hinge shaft is received within an opening of the hinge plate.

15. The household appliance of claim 13, the hinge shaft comprising a hollow through passage such that electrical wires can extend from the body of the household appliance through the passage and into the door of the household appliance.

16. The household appliance of claim 1, further comprising a cover connected to the foot assembly, wherein the cover encloses the frame base portion, the door sensor support, and the at least one component of the door sensor.

17. The household appliance of claim 1, the at least one component of the door sensor configured to interact with an additional component of the door sensor attached to the door.

18. The household appliance of claim 1, wherein the household appliance is a refrigerator.

19. A household appliance comprising a body with a cooled compartment, a door that restricts and grants access to said cooled compartment, an electronic component on the door, and a foot assembly to couple the door to the body, the foot assembly comprising:

a hinge plate connected to the body of the household appliance and comprising a hinge shaft pivotally connected to said door of the household appliance such that the door can pivot between an open position and a closed position with respect to the cooled compartment;

a foot assembly connected to the body and comprising at least one of an anti-tip foot to support the appliance and/or a wheel to facilitate moving the household appliance; and an electrical connector support configured to support said electronic component on said door, the electrical connector support comprising:

a frame base portion connected to the foot assembly; and a wire guide to retain and guide electrical wires extending between an electronic controller contained within or attached to the body and a user interface contained on the door, wherein the user interface enables a user to adjust a temperature of said cooled compartment.

20. The household appliance of claim 19, wherein the electrical connector support further comprises:

a door sensor support attached to the frame base portion; and a door sensor configured to sense if the door is at an open or a closed position relative to the body, wherein at least one component of the door sensor is attached to the door sensor support.

* * * * *